US012593287B2

(12) United States Patent
Chukka

(10) Patent No.: US 12,593,287 B2
(45) Date of Patent: Mar. 31, 2026

(54) ENHANCED MM WAVE COVERAGE USING ADAPTIVE POWER ADJUSTMENTS

(71) Applicant: T-MOBILE INNOVATIONS LLC, Overland Park, KS (US)

(72) Inventor: Chaitanya Chukka, Carol Stream, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 324 days.

(21) Appl. No.: 18/508,436

(22) Filed: Nov. 14, 2023

(65) Prior Publication Data

US 2025/0159615 A1     May 15, 2025

(51) Int. Cl.
| | |
|---|---|
| *H04W 52/24* | (2009.01) |
| *H04W 40/08* | (2009.01) |
| *H04W 40/20* | (2009.01) |

(52) U.S. Cl.
CPC ......... *H04W 52/242* (2013.01); *H04W 40/08* (2013.01); *H04W 40/20* (2013.01); *H04W 40/205* (2013.01)

(58) Field of Classification Search
CPC ... H04W 52/242; H04W 40/08; H04W 40/20; H04W 40/205
See application file for complete search history.

(56) References Cited

U.S. PATENT DOCUMENTS

| | | | | |
|---|---|---|---|---|
| 11,533,084 | B2 * | 12/2022 | Newman | H04L 1/0003 |
| 2009/0298470 | A1 * | 12/2009 | Huber | H04W 76/10 |
| | | | | 455/411 |

| | | | | |
|---|---|---|---|---|
| 2014/0248920 | A1 * | 9/2014 | Venkatachari | H04W 52/56 |
| | | | | 455/522 |
| 2015/0340875 | A1 * | 11/2015 | Prasad | H02J 50/60 |
| | | | | 307/104 |
| 2016/0189514 | A1 * | 6/2016 | Todasco | G08B 25/08 |
| | | | | 340/8.1 |
| 2019/0222652 | A1 * | 7/2019 | Graefe | H04L 67/12 |
| 2019/0268780 | A1 * | 8/2019 | Sarkar | H04B 17/318 |
| 2020/0170093 | A1 * | 5/2020 | Mirsky | H04B 10/502 |
| 2020/0195310 | A1 * | 6/2020 | Abedini | H04B 7/0456 |
| 2020/0249343 | A1 * | 8/2020 | Yu | G01S 13/93 |
| 2020/0266669 | A1 * | 8/2020 | Paidimarri | H02J 50/90 |
| 2020/0326704 | A1 * | 10/2020 | Blanco | G05D 1/0088 |
| 2021/0037441 | A1 * | 2/2021 | Khalid | H04W 36/22 |

(Continued)

*Primary Examiner* — Dominic E Rego

(74) *Attorney, Agent, or Firm* — SHOOK, HARDY & BACON L.L.P.

(57)     ABSTRACT

The technology disclosed herein relates to enhancing millimeter (mm) wave coverage within a wireless telecommunications network. It is commonly known that mm waves have difficulty propagating through materials. Urban areas pose significant hurdles for mm waves since a line of sight (LOS) to a user device is often times blocked by a physical object (e.g., building, tree, car, etc.). However, mm waves are desirable because of the wide bandwidths available for carrying communications at that frequency range. Embodiments herein provide methods, systems, and computer-storage media for adjusting a transmission power of a mm wave such that it can propagate through a physical object when a permittivity of an external material of the physical object is within a specified range where power adjustment would successfully propagate the mm wave through the physical object.

20 Claims, 3 Drawing Sheets

(56) References Cited

U.S. PATENT DOCUMENTS

| | | | | |
|---|---|---|---|---|
| 2023/0251157 A1* | 8/2023 | Gupta | ...................... | G01C 5/06 |
| | | | | 702/98 |
| 2023/0365124 A1* | 11/2023 | Shahriari | .............. | B60W 30/09 |
| 2023/0397131 A1* | 12/2023 | Sung | ................... | H04W 52/367 |
| 2024/0088559 A1* | 3/2024 | Jiang | ........................ | H01Q 3/36 |
| 2024/0411021 A1* | 12/2024 | Kalam | ................. | H04W 24/08 |

* cited by examiner

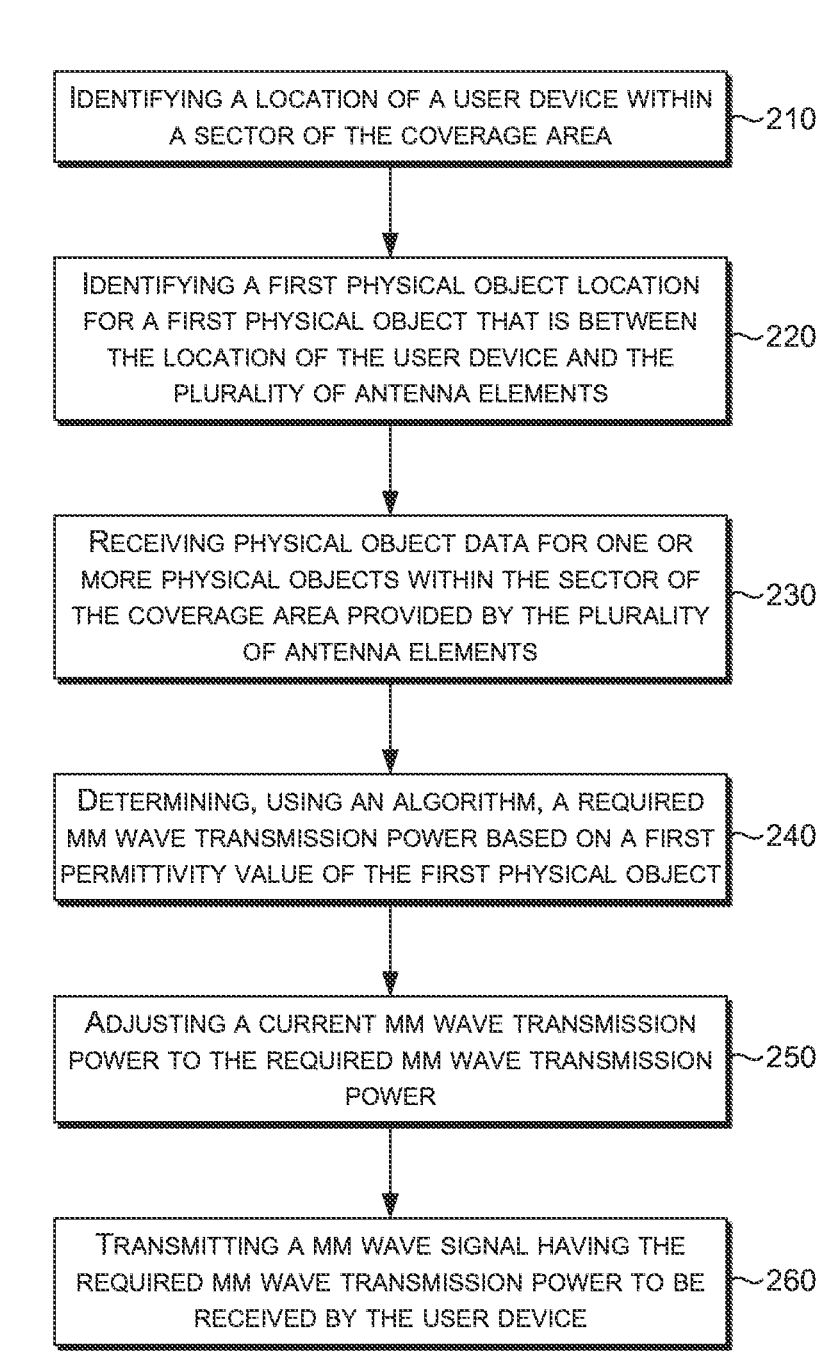

200

IDENTIFYING A LOCATION OF A USER DEVICE WITHIN A SECTOR OF THE COVERAGE AREA —210

IDENTIFYING A FIRST PHYSICAL OBJECT LOCATION FOR A FIRST PHYSICAL OBJECT THAT IS BETWEEN THE LOCATION OF THE USER DEVICE AND THE PLURALITY OF ANTENNA ELEMENTS —220

RECEIVING PHYSICAL OBJECT DATA FOR ONE OR MORE PHYSICAL OBJECTS WITHIN THE SECTOR OF THE COVERAGE AREA PROVIDED BY THE PLURALITY OF ANTENNA ELEMENTS —230

DETERMINING, USING AN ALGORITHM, A REQUIRED MM WAVE TRANSMISSION POWER BASED ON A FIRST PERMITTIVITY VALUE OF THE FIRST PHYSICAL OBJECT —240

ADJUSTING A CURRENT MM WAVE TRANSMISSION POWER TO THE REQUIRED MM WAVE TRANSMISSION POWER —250

TRANSMITTING A MM WAVE SIGNAL HAVING THE REQUIRED MM WAVE TRANSMISSION POWER TO BE RECEIVED BY THE USER DEVICE —260

*FIG. 2*

MEMORY

304

PROCESSOR(S)

306

PRESENTATION
COMPONENT(S)

308

RADIO(S)

316

I/O PORT(S)

310

I/O COMPONENTS

312

POWER SUPPLY

314

302

300

ENHANCED MM WAVE COVERAGE USING ADAPTIVE POWER ADJUSTMENTS

SUMMARY

A high-level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with enhancing millimeter (mm) wave coverage based on adjusting a power level of a transmitted mm wave within an environment having various physical objects, substantially as shown in and/or described in connection with at least one of the figures, and as set forth more completely in the claims.

In aspects set forth herein, and at a high level, the technology described herein relates to determining, using an algorithm (e.g., an adaptive learning algorithm), a mm wave transmission power level based on one or more locations of one or more user devices and physical object data of physical objects (e.g., within a portion of a coverage area or within a sector footprint) that are located between a user device and a plurality of antenna elements (e.g., of a base station) for mm wave signal transmissions by the antenna elements. For example, physical objects between the user device and antenna elements can include trees, buildings, vehicles, billboards, another type of physical object, or one or more combinations thereof. As another example, the physical object data of the physical objects can include one or more external materials of one or more surfaces of the physical objects, such as metal, concrete, glass, another type of material, or one or more combinations thereof. The materials of the one or more surfaces of the physical objects can have varying permittivity. The mm wave transmission power can be determined based on analyzing the permittivity of the physical objects to identify a propagation loss and comparing it to a propagation loss threshold. In some embodiments, the mm wave transmission power is increased when the propagation loss is less than a propagation loss threshold. In other embodiments, when the propagation loss is greater than a propagation loss threshold, a new path for the mm wave is determined or a handoff to another frequency band can be initiated.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 2 illustrates an example flowchart for determining the mm wave transmission power, in accordance with aspects herein.

DETAILED DESCRIPTION

Figure 1:
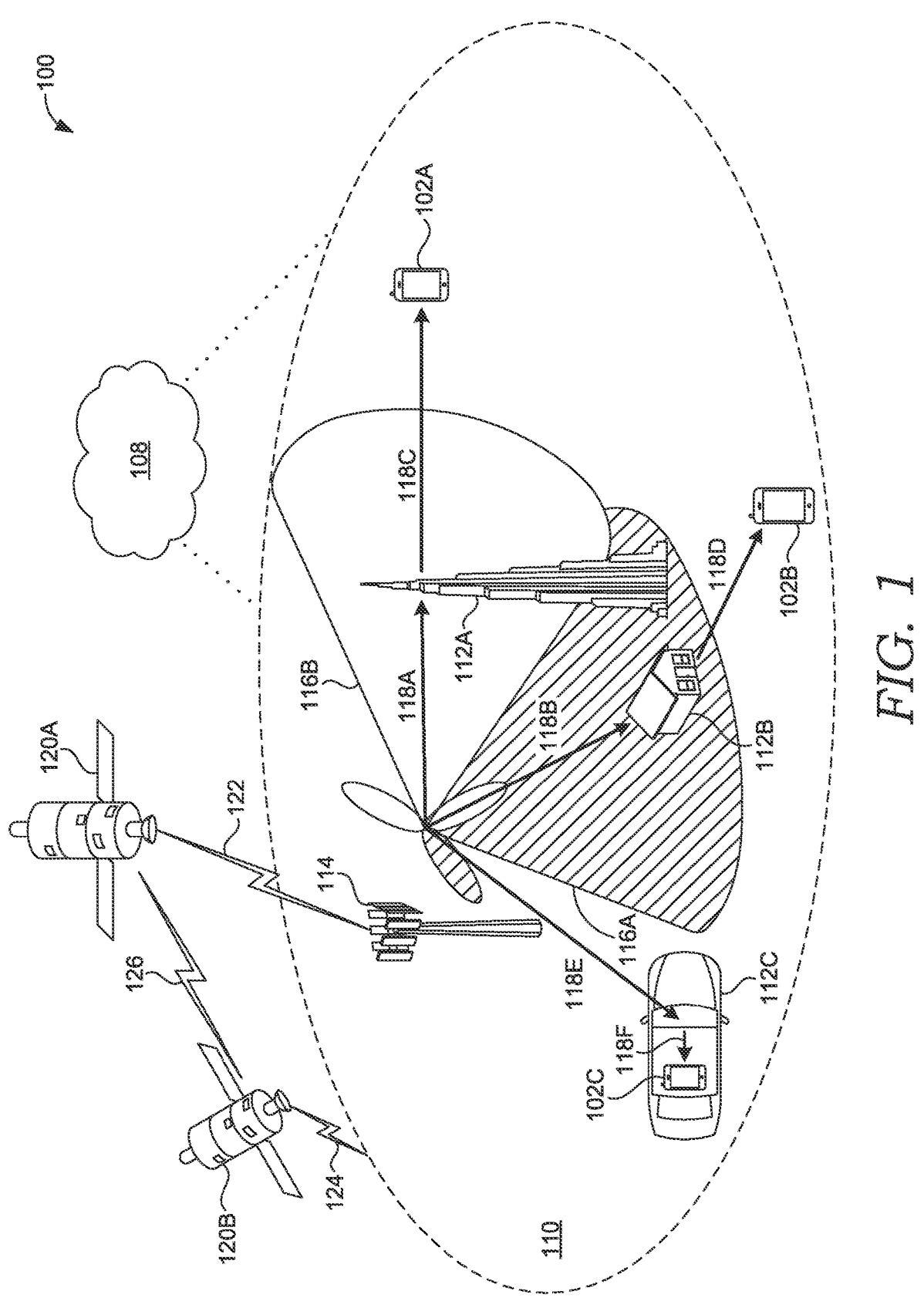
FIG. 1 depicts an example operating environment for determining a millimeter (mm) wave transmission power to a user device, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FD-MIMO Full-Dimension Multiple-Input Multiple-Output
GPS Global Positioning System
IoT Internet of Things
LAN Local Area Network
LTE Long Term Evolution
MIMO Multiple-Input Multiple-Output
mm wave Millimeter wave
MME Mobility Management Entity
MU-MIMO Multi-User Multiple-Input Multiple-Output
NR New Radio
PC Personal Computer
PDA Personal Digital Assistant
RAM Random Access Memory
RF Radio-Frequency
ROM Read Only Memory
RSRP Reference Signal Received Power
RSRQ Reference Transmission Receive Quality
RSSI Received Signal Strength Indicator
SNR Signal-to-Noise Ratio
SRS Sound Reference Signal
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a mm wave transmission includes one or more frequency ranges of 24 GHz, 26 GHz, 28 GHz, 39 GHz, and 52.6-71 GHz.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A-102C described herein with respect to FIG. 1.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different wireless telecommunication technologies or standards, including, but not limited to, CDMA 1xAdvanced, GPRS, Ev-DO, TDMA, GSM, WiMAX technology, LTE, LTE Advanced, other technologies and standards, or one or more combinations thereof.

A "network" providing the telecommunication services (e.g., network 108 of FIG. 1) may be one or more telecommunications networks, or a portion thereof. The telecommunications network might include an array of devices or components (e.g., one or more base stations). The network can include multiple networks, and the network can be a network of networks. In embodiments, the network or a portion thereof is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or one or more combinations thereof, to user devices or corresponding users that are registered or subscribed to a telecommunication service provider to utilize the one or more services. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the telecommunications network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. A base station may be, in an embodiment, similar to base station 114 described herein with respect to FIG. 1.

For example, the base station may refer to a base transceiver station, a radio base station, an access point, a radio transceiver, a NodeB, an eNB, a gNB, a Home NodeB, a Home eNodeB, another type base station, or one or more combinations thereof. A node corresponding to the base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with providing mm wave transmissions. For example, prior relevant technologies providing telecommunication services via mm wave signals have increased signal attenuation (e.g., blockage loss, path loss, propagation loss) based on propagation environments and densities of blockages. For instance, dense urban areas have many blockages that increase signal fading, which results in performance degradation, thereby further resulting in handoff to other frequency bands or dropped calls within a standalone environment. As one example, an impact on throughput can occur around −95 dBm in terms of RSRP measurements.

The technology provided herein can alleviate the problems discussed above. For example, the technology disclosed herein decreases signal attenuation, decreases signal fading, and increases uplink and downlink throughput by determining mm wave transmission powers based on permittivity data of physical objects within the line of sight (LOS) between user equipment (UE) and the plurality of antenna elements providing service to a coverage area (i.e., between the UE and the plurality of antenna elements). In addition, the technology disclosed herein can improve communications between or among user devices by improving quality of service and user experience. Further, the technology and corresponding techniques can enhance the reliability and functionality of communications.

In an embodiment, a system is provided for enhancing mm wave coverage within a wireless telecommunication network. The system comprises one or more processors communicatively coupled with a plurality of antenna elements that provide a coverage area and computer memory storing computer-usable instructions that, when executed by the one or more processors, cause the system to perform operations. The operations comprise identifying a location of a user device within a sector of the coverage area; identifying a first physical object location for a first physical object that is between the location of the user device and the plurality of antenna elements; receiving physical object data for one or more physical objects within the sector of the coverage area provided by the plurality of antenna elements, wherein the physical object data comprises a permittivity value for each of the one or more physical objects; determining, using an algorithm, a required mm wave transmission power based on a first permittivity value of the first physical object; adjusting a current mm wave transmission power to the required mm wave transmission power; and transmitting a mm wave signal having the required mm wave transmission power to be received by the user device.

In another embodiment, a method is provided for enhancing mm wave coverage within a wireless telecommunication network. The method comprises identifying a location of a user device within a sector of the coverage area; identifying a first physical object location for a first physical object that is between the location of the user device and the plurality of antenna elements; receiving physical object data for one or more physical objects within the sector of the coverage area provided by the plurality of antenna elements, wherein the physical object data comprises a permittivity value for each of the one or more physical objects; determining, using an algorithm, a required mm wave transmission power based on a first permittivity value of the first physical object; adjusting a current mm wave transmission power to the required mm wave transmission power; and transmitting a mm wave signal having the required mm wave transmission power to be received by the user device.

In yet another embodiment, one or more non-transitory computer storage media having computer-executable instructions embodied thereon, that when executed by at least one processor, cause the at least one processor to perform a method. The method comprises identifying a location of a user device within a sector of the coverage area; identifying a first physical object location for a first physical object that is between the location of the user device and the plurality of antenna elements; receiving physical object data for one or more physical objects within the sector of the coverage area provided by the plurality of antenna elements, wherein the physical object data comprises a permittivity value for each of the one or more physical objects; determining, using an algorithm, a required mm wave transmission power based on a first permittivity value of the first physical object; adjusting a current mm wave transmission power to the required mm wave transmission power; and transmitting a mm wave signal having the required mm wave transmission power to be received by the user device.

Those skilled in the art will appreciate that the computing devices described herein need not be limited to conventional personal computers, and can include other computing configurations, including servers, hand-held devices, multiprocessor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example environment 100 supports the enhancing mm wave coverage by adjusting the transmission power of one or more mm wave signals within a wireless telecommunications network, in accordance with one or more embodiments disclosed herein. Example environment 100 is but one example of a suitable environment for the improved mm wave coverage techniques disclosed herein, and is not intended to suggest any limitation as to the scope of use or functionality of the invention. Neither should the environment 100 be interpreted as having any dependency or requirement relating to any one or combination of components illustrated.

Example environment 100 includes user devices 102A-102C, network 108, coverage area 110, base station 114, sectors 116A and 116B (not drawn to scale, for example, the user devices are illustrated as outside the sectors but can be within them) within coverage area 110, mm wave signals 118A-118F from antenna elements of base station 114 that propagate, or go through (i.e., not around or reflected by), a physical object such as objects 112A, 112B, and 112C, satellites 120A and 120B, communication link 124 corresponding to satellite 120B and communication link 122 corresponding to satellite 120A, and communication link 126 between satellites 120A and 120B.

Example environment 100 having network 108 and coverage area 110 may be associated with one or more of a non-terrestrial network, an LTE network, an LTE-A network, an LTE-A Pro network, an NR network, a mm wave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof. In some embodiments, one or more of the mm wave signals 118A-118F may correspond to the enhanced broadband communication, ultra-reliable communication, low latency communication, another type of communication, or one or more combinations thereof.

In embodiments, user devices 102A-102C may wirelessly communicate via one or more wireless telecommunication services provided by one or more base stations (e.g., base station 114), one or more satellites (e.g., satellites 120A and 120B), other types of wireless telecommunication devices, or one or more combinations thereof. In example environment 100, network 108, base station 114, and satellites 120A-120B can provide coverage area 110 for supporting communication signals according to one or more radio access technologies. Supported communication signals within coverage area 110 can include MU-MIMO and SU-MIMO transmissions, for example. As such, one or more of the mm wave signals 118A-118F may correspond to the wireless telecommunication services provided within coverage area 110.

In embodiments, the user devices 102A-102C can be stationary, mobile, or one or more combinations thereof at different times. The user devices 102A-102C may be able to communicate with various types of devices, such as other UEs, various types of base stations, or various types of network equipment (e.g., core network nodes, relay devices, integrated access and backhaul nodes, other network equipment, or one or more combinations thereof). In embodiments, one or more of the user devices 102A-102C may have different capabilities. For instance, a user device can be wearable devices having a camera, microphone, RFID, GPS, another sensor, or one or more combinations thereof. In some embodiments, a user device is a wearable device can be a watch-type electronic wearable device, a glasses-type wearable device, an upper-torso wearable device (e.g., a shirt having sensors affixed on or within the material of the shirt or a device that is attachable to the shirt), another type of wearable device, or one or more combinations thereof.

In embodiments, one or more of the user devices 102A-102C may include one or more of a unit, a station, a terminal, or a client, for example. The user devices 102A-102C may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102C may, at one time or another, act as a relay, base station, (e.g., a UAV acting as an aerial base station), or the network equipment (e.g., macro eNBs or gNBs, small cell eNBs or gNBs, or relay base stations). As such, in other embodiments, one or more of the mm wave signals 118A-118F may be received by or transmitted from the unit, station, terminal, client, a wireless local loop station, an IoT device, an Internet of Everything device, a machine type communication device, an evolved or enhanced machine type communication device, a user device implemented in an object, another type of user device, or one or more combinations thereof.

Coverage area 110 can provide services from network 108, such as network provider services including the Internet, Intranet, Internet Protocol Multimedia Subsystem, Packet-Switched Streaming Service, another type of network provider service, or one or more combinations thereof. In embodiments, the user devices 102A-102C, base station 114, and satellites 120A-120B can be configured to support ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof, associated with the mm wave signals 118A-118F. In addition, the one or more of the mm wave signals 118A-118F may correspond to a network provider service (e.g., Internet, Intranet, Internet Protocol Multimedia Subsystem, Packet-Switched Streaming Service).

In embodiments, one or more of the user devices 102A-102C, the base station 114, or another network component (e.g., an MME), or one or more combinations thereof, may have one or processors capable of processing physical object data, user device location data, weather data (e.g., humidity data, ultraviolet data, temperature data, precipitation data, etc.), ultra-reliable data, low-latency data, critical data, other types of data corresponding to mm wave signals 118A-118F, or one or more combinations thereof. In some embodiments, the one or more processors may include a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, a processor unit may be located in a single integrated circuit component (e.g., multi-chip module) or in separate integrated circuit components.

Base station 114 and satellites 120A-120B may communicate with the wireless telecommunications network 108 via a core network, one or more network components (e.g., a core network node, a relay device, an MME, an integrated access and backhaul node, a macro eNB, a small cell eNB, a gNB, a relay base station), or one or more combinations thereof. In some embodiments, the base station 114, satellite 120A, satellite 120B, or one or more combinations thereof, communicates with the wireless telecommunications network 108 over one or more backhaul links (e.g., via an X2, Xn, or other interface) either directly (e.g., directly between base stations), or indirectly (e.g., via core network), or one or more combinations thereof. The backhaul links may be or include one or more wireless links, for example. As such, one or more of the mm wave signals 118A-118F can correspond to one or more communications from one or more of base station 114, satellite 120A, satellite 120B, or one or more combinations thereof.

In embodiments, base station 114 may operate using MIMO transmissions. For example, the base station 114 can be configured as FD-MIMO, massive MIMO, MU-MIMO, cooperative MIMO, 4G, 5G, another generation communication system, or one or more combinations thereof, for providing telecommunication services to one or more of user devices 102A-102C via mm waves 118A-118G. The base station 114 can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for a non-access stratum message or node selection, a synchronization, radio access network sharing, multimedia broadcast multicast service, subscriber and equipment trace, radio access network information management, paging, positioning, delivery of warning messages, other functions, or one or more combinations thereof. As such, one or more of the mm wave signals 118A-118F may be associated with the FD-MIMO, massive MIMO, MU-MIMO, cooperative MIMO, 4G, 5G, another generation communication system, one or more of the corresponding functions of such system, or one or more combinations thereof.

In some embodiments, one or more base station antennas (or antenna arrays) having antenna elements may be co-located at an antenna assembly, such as an antenna tower. In some examples, antennas or antenna arrays associated with base station 114 may be located in diverse geographic locations. In embodiments, antenna elements of one or more antennas may each be within a threshold distance from at least one of the other antenna elements. In some aspects, one or more nodes corresponding to base station 114 may comprise one or more macro cells, one or more small cells, one or more relay base stations, one or more repeaters, one or more femtocells, other types of cells, or one or more combinations thereof. In other embodiments, base station 114 may be movable, thereby providing communication coverage for a moving geographic coverage area 110. In some embodiments, one or more antennas of base station 114 may use MIMO antenna technology, including spatial multiplexing, beamforming, transmit diversity, other MIMO functions, or one or more combinations thereof.

Satellites 120A-120B may communicate with base station 114, user devices 102A-102C, or other high altitude or terrestrial communications devices. For example, the satellites 120A-120B may communicate using mm wave signals. "Satellite" may also be referred to as a space vehicle or communication satellite. Satellites 120A-120B may be any suitable type of communication satellite configured to relay communications between different end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110). The satellites 120A-120B may be any distance away from the surface of the earth.

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mm wave signals, optical signals via a laser, another type of communication link, or one or more combinations thereof. In embodiments, satellites 120A-120B may be configured to communicate via a wireless common public radio interface protocol, a dedicated wireless front haul protocol developed for high-altitude-to-high-altitude, another protocol, or one or more combinations thereof.

In some embodiments, one or more portions of coverage area 110 may be provided or established by satellites 120A-120B as part of a non-terrestrial network. Satellites 120A-120B may, in some cases, perform the functions of base station 114 or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa.

In embodiments, base station 114 provides sectors 116A and 116B within coverage area 110. In some embodiments, one or more of satellites 120A and 120B may provide sectors 116A and 116B. In example environment 100, antenna elements of base station 114 provide mm wave signals 118A-118F to be received by user devices 102A-102C. In some embodiments, one or more of mm wave signals 118A-118F include a plurality of mm wave signals.

In some environments, the mm wave signals can encounter difficulty with transmission due to a LOS blockage with the user device. In other words, when a physical object is in the LOS of sight between the antenna elements and the UE, a LOS blockage occurs such that there is not a direct transmission from the antenna elements to the UE that is not disturbed by a physical object blocking the LOS path. Each physical object, as described herein, can be associated with an external material, which can be associated with a permittivity value. Permittivity, as used herein, refers to a property that measures the opposition against an electric field. Permittivity affects how electric fields propagate and penetrate materials. Permittivity also relates to object penetration loss (dB) (e.g., building penetration loss) and propagation loss of the signal. Propagation loss, as used herein, refers generally to the reduction in signal strength as it travels from one point to another. Penetration loss, as used herein, refers generally to the fading of signals due to obstructions of physical objects.

These losses have been a known problem and have been extensively studied. For instance, lab experiments have shown that penetration losses of particular external materials of physical objects vary from one another. Concrete, for instance, has been found to have a penetration loss value of 30-35 dB. Similarly, tinted glass also has a high penetration loss value of approximately 25 dB. Conversely, drywall is found to have a much lower penetration loss value of 7-12 dB and clear glass, similarly, has a low penetration loss value of approximately 5 dB. External materials having a higher penetration loss value (i.e., a penetration loss value greater than a predetermined penetration loss value) are much more difficult for a mm wave to propagate. Conversely, mm waves can still struggle with propagating through external materials having a lower penetration loss value (i.e., a penetration loss value lower than a predetermined penetration loss value) but have a higher likelihood of successful propagation as the penetration loss value decreases.

Thus, a determination that the penetration loss value is above a predetermined penetration loss value can result in a decision to handoff the session to a different set of antenna elements. In embodiments, the session is handed off to a different set of antenna elements that is not impacted by the same blocking physical object. A determination that the penetration loss value is below a penetration loss value can result in a decision to increase the power of the mm wave transmission signal.

The transmission power of the mm wave signals 118A-118F can be determined using an adaptive learning algorithm and applying the algorithm to this data (e.g., permittivity values, penetration loss values, penetration loss thresholds, and the like) to determine a mm wave transmission power. As used herein, penetration loss and propagation loss can both be used to refer to the reduction in signal from one point to another.

In some embodiments, the mm wave transmission power associated with mm wave signal 118A-118G) and received by user devices 102A-102C can be determined using the adaptive learning algorithm. For example, the mm wave transmission power can be determined using one or more of a location associated with the antenna elements of base station 114 and an external material of the physical object 112A associated with the permittivity value of the external material and a penetration loss of the external material. Assume that the external material of the building 112A is concrete. Concrete has a high penetration loss value that cannot be compensated for with more power in the transmission signal so it would not be determined to increase the power of signal 118A. However, if we assume the external material of the building 112A is glass, for instance, a power level may be increased in order for the mm wave to successfully propagate through the building 112A to the UE 102A, as shown by the traveling of signal 118A through the building 112A as signal 118C traveling to the UE 102A.

Similarly, the physical object may be a house, such as house 112B. The house could have an external material of brick, resulting in a handoff as the mm wave will no propagate through the brick. Alternatively, a signal 118B could propagate through glass of the house to reach the UE 102B via the propagated signal 118D that has increased power in order to propagate through the home. In another embodiment, the signal could original inside the home such that a physical object blockage such as drywall could also be propagated with an increased signal.

Lastly, another example illustrates a car 112C as a physical object between the UE 102C and the signal 118E originating from the base station 114. As shown, the signal 118E is directed to a windshield of the car 112C. As previously discussed, glass is associated with a propagation loss value that would trigger an increase in power of the transmission signal such that the signal can continue on, through the windshield, and signal 118F reaches the UE 102C.

In embodiments, the adaptive learning algorithm can learn from feedback received by one or more of the user devices 102A-102C. For example, feedback data may include a delay between transmission and receipt associated with the mm wave signal, velocity of the mm wave signal received by the user device, displacement amplitude, intensity of the mm wave signal received by the user device, penetration loss, propagation loss, SRS, RSRP measurements, other types of feedback, or one or more combinations thereof. In some embodiments, the mm wave transmission power can be adjusted using the adaptive learning algorithm and the feedback received, such as the SRS, the RSRP measurement, additional physical object data (e.g., the window of a building being open), or one or more combinations thereof.

In embodiments, a database (not shown) storing the physical object data (e.g., associated with physical objects 112A-112C) may be accessible by one or more user devices, one or more base stations, one or more network components, one or more satellites, or one or more combinations thereof (e.g., based on an authentication procedure). In some embodiments, the physical object data may be obtained from one or more of the plurality of satellites 120. For example, one or more of the satellites 120 may be an Albedo satellite, a WorldView satellite, a GeoEye satellite, a QuickBird satellite, a SuperView satellite, a Pelican satellite, a Pleiades satellite, another type of satellite, or one or more combinations thereof. In some embodiments, the physical object data is stored in one or more tables based on physical object material data, such as a permittivity value of the external material of physical objects. For example, the physical object data can be labeled based on external material type and can have one or more associated permittivity values, propagation loss values, etc. As another example, a modeling map can include physical object data associated with roads, such as road material, road obstructions (e.g., signs), blockings along each road (e.g., poles, vehicles), widths of the roads, lengths of the roads, positioning of the roads, temperatures of the roads throughout times of each day, precipitation on the roads, other associated physical object data, or one or more combinations thereof. In another example, modeling map can also include cloud density data associated with a particular atmospheric range, temperatures at various altitudes associated with a particular geographic region and coverage area, precipitation data associated with the coverage area, humidity data associated with the coverage area, other environmental data, or one or more combinations thereof.

In embodiments, the physical object data associated with modeling map may include locations and positions of buildings within a coverage area, heights of each building within the coverage area, location data and position data associated with buildings being constructed or buildings under construction, one or more surface areas for one or more surfaces of the buildings and other physical objects, external material of the physical objects (e.g., wood, concrete, metal, plastic, glass, drywall, tinted glass), a permittivity value of the external material, a propagation loss value of the external material, other types of physical object data, or one or more combinations thereof. The database can be updated periodically or a-periodically. In some embodiments, the database is updated based on a triggering event (e.g., detection of a demolition of a building, detection of a vehicle moving within a particular mm wave transmission path).

Modeling map may also include, as previously mentioned, natural environmental data such as atmospheric data (e.g., oxygen absorption, water vapor absorption), precipitation data (e.g., rain, snow, sleet), foliage blockage (e.g., specific types of trees have foliage blockage at particular times of year and not others), etc. Rain, in particular, is known to negatively impact mm wave propagation. Raindrops are roughly the size of radio wavelengths and can cause scattering of the radio signal. The algorithm can ingest the environmental data and determine if an increase in the mm wave transmission power would successfully propagate the signal or if a handoff to a different frequency band is appropriate. With rain, for instance, a rain rate (mm/hour) below a predetermined rain rate threshold results in a decision to increase the mm wave transmission power while a rain rate above a predetermined rain rate threshold would result in a handoff to a different frequency band since the mm wave propagation is not likely to be successful with a power increase.

Example Flowchart

Having described the example embodiments discussed above, an example flowchart is described below with respect to FIG. 2. Example flowchart 200 begins at 210 with identifying a location of a user device. For example, a user device may request access to a telecommunication service (e.g., email, a message service, (e.g., SMS messages, MMS messages, instant messaging messages, an EMS service messages), an application service, a data service, other types of wireless telecommunication services, or one or more combinations thereof, and the user device can thereby be identified based on one or more of these requests. In some embodiments, location data for the user device is identified or determined. For example, the location data may comprise GPS or other satellite location services data, terrestrial triangulation data, an access point location data associated with a user device, other location data, or one or more combinations thereof. The location data may indicate one or more geographic locations of one or more of a user device, an antenna or antenna array of a base station or satellite, a coverage area, a sector associated with a coverage area, a sector footprint associated with a coverage area, or one or more combinations thereof. In some embodiments, the user device is identified based on a mobile device number, a request for a webpage, an authentication request, a transition of the user device from one sector of a coverage area to another sector of a coverage area, another type of request or transition, or one or more combinations thereof.

At 220, a physical object is identified between the location of the UE and the plurality of antenna elements. At 230, physical object data is received for at least the physical object identified as being located between the UE and antenna elements (e.g., that are within a line of sight (LOS) between the UE and antenna elements). For example, the physical object data may include one or more external material of the physical objects (e.g., concrete, metal, glass, drywall), a permittivity value of the external material, a propagation loss value of the external material, a thickness of the external material, a thickness of material coupled to the external material, coordinates (e.g., a height, width, length, altitude, depth, or one or more combinations thereof) associated with the physical object, other types of physical object data, or one or more combinations thereof.

At 240, a mm wave transmission power is determined based on identifying the user device (e.g., based on a request from a user device or based on a location of the user device) and based on the physical object data. For example, an algorithm may be used for determining the mm wave transmission power. The algorithm may be an adaptive learning algorithm utilized as part of a beamforming management procedure, the adaptive learning algorithm being adaptable over time based on learning from user device feedback associated with received mm wave signals. For example, the adaptive learning algorithm can be trained based on feedback from a lab environment and continuously updated during base station and user device deployment (e.g., in an urban setting). In embodiments, the algorithm is a deep reinforcement learning based beamform management algorithm that utilizes machines learning and an artificial neural network to update and apply a predictive model for beam selection and mm wave transmission during a beam-forming management procedure. For example, the adaptive learning algorithm can learn from mm wave transmissions within a particular environment (e.g., a particular city or portion thereof). In some embodiments, the adaptive learning algorithm can be used to build a user device codebook for beam indications of a beam management procedure.

In some embodiments, the adaptive learning is performed using a deep belief network of probabilistic models having multiple layers of hidden nodes, which may be obtained by stacking layers of restricted Boltzmann machines (artificial neural networks that learn a probability distribution over a set of inputs). In some embodiments, the adaptive learning is performed using a deep convolutional network trained using supervised learning.

In some embodiments, the mm wave transmission power can be determined based on the external material data for a physical object within a coverage area (e.g. within a sector footprint) including the permittivity of the external material of the physical object. For example, the mm wave transmission power is determined based on a permittivity value of the external material of the physical object, and the predictive model can be updated based on the actual permittivity value of the external material to the user device based on user device feedback.

In embodiments, the adaptive learning algorithm can be used to determine a plurality of mm wave transmission powers (e.g., a first mm wave transmission power and a second mm wave transmission power) based on one or more locations of one or more user devices and the physical object data for the physical objects within a sector, or portion thereof, of a coverage area. In embodiments, the first mm wave transmission path can be determined based on a first physical object having a first external material, identified from the physical object data, which is different from a second external material of a second physical object. For example, the different external materials may result in differing permittivity values and, thus, penetration loss values. Continuing this example, the second mm wave transmission power may be determined based on the second external material of the second physical object.

At 250, a current power level of the mm wave is adjusted to the required mm wave transmission power (i.e., the mm wave transmission power needed to propagate the external material of the building with a propagation loss that is reduced from the propagation loss value associated with the external material of the physical object).

At 260, one or more mm wave signals are transmitted from one or more antenna elements (e.g., of a base station) having the required mm wave transmission power to be received by the UE.

Feedback can be received from the UE based on one or more mm wave transmissions. For example, the feedback may include quality of channel indicators, propagation loss values, etc. Based on the feedback received from the user device, the mm wave transmission power can be adjusted. For example, in some embodiments, the mm wave transmission power is adjusted using the adaptive learning algorithm and one or more RSRP measurements received from the user device. In yet another example, the mm wave transmission power can be adjusted using measured intensity of the mm wave signal received by the user device, penetration loss, other types of feedback, or one or more combinations thereof. As such, the adjusted mm wave transmission power can be used for transmitting one or more additional mm wave signals to the user device.

Example User Device

Having described the example embodiments discussed above of the presently disclosed technology, an example operating environment of an example user device (e.g., user device 102A of FIG. 1) is described below with respect to FIG. 3. User device 300 is but one example of a suitable computing environment, and is not intended to suggest any particular limitation as to the scope of use or functionality of the technology disclosed. Neither should user device 300 be interpreted as having any dependency or requirement relating to any particular component illustrated, or a particular combination of the components illustrated in FIG. 3.

Figure 3:
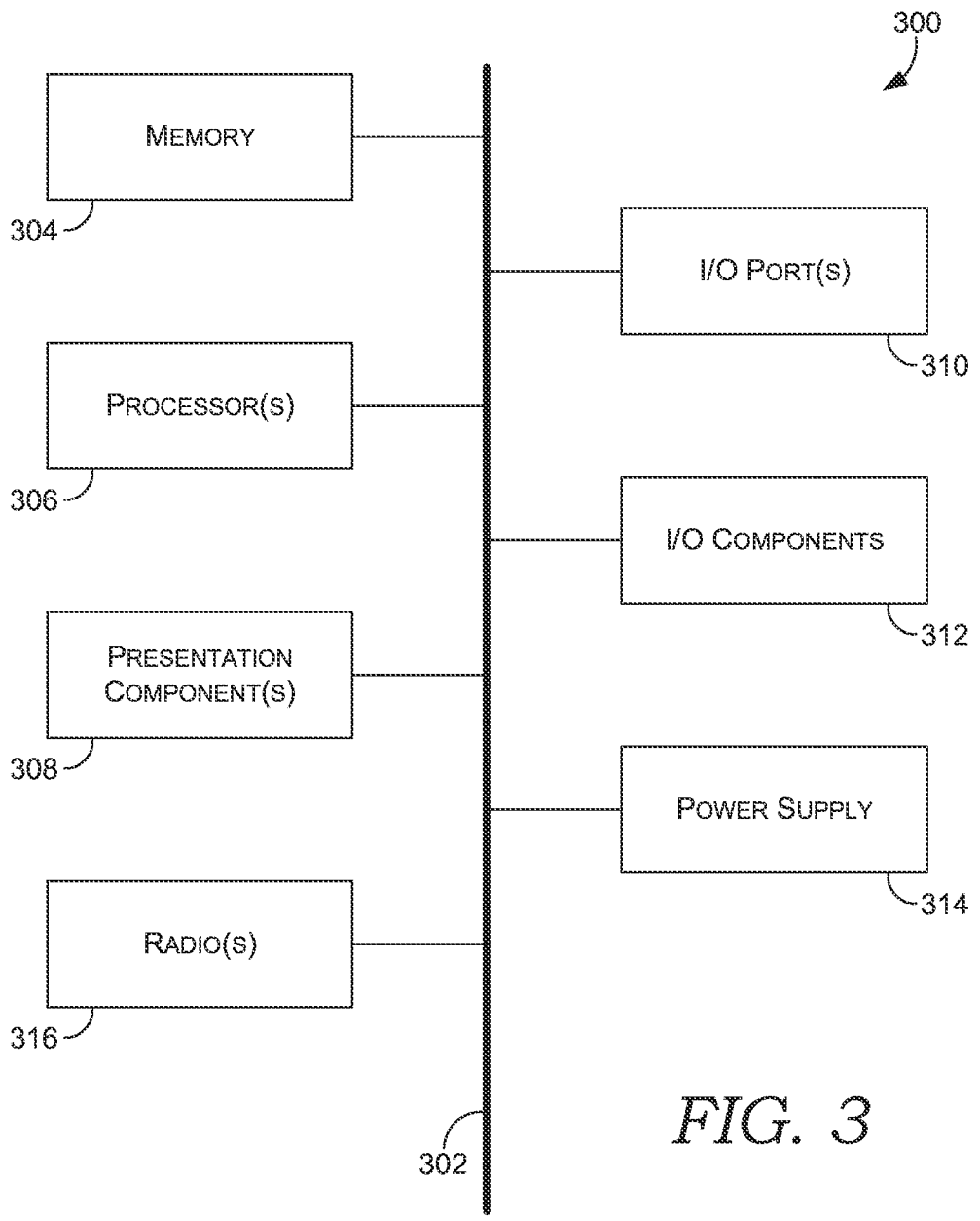
FIG. 3 depicts an example user device suitable for use in implementations of the present disclosure, in accordance with aspects herein.

As illustrated in FIG. 3, example user device 300 includes a bus 302 that directly or indirectly couples the following devices: memory 304, one or more processors 306, one or more presentation components 308, one or more input/output (I/O) ports 310, one or more I/O components 312, a power supply 314, and one or more radios 316.

Bus 302 represents what may be one or more busses (such as an address bus, data bus, or combination thereof). Although the various blocks of FIG. 3 are shown with lines for the sake of clarity, in reality, these blocks represent logical, not necessarily actual, components. For example, one may consider a presentation component, such as a display device, to be an I/O component. Also, processors have memory. Accordingly, FIG. 3 is merely illustrative of an exemplary user device that can be used in connection with one or more embodiments of the technology disclosed herein.

User device 300 can include a variety of computer-readable media. Computer-readable media can be any available media that can be accessed by user device 300 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 300. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 304 includes computer storage media in the form of volatile and/or nonvolatile memory. The memory 304 may be removable, non-removable, or a combination thereof. Example hardware devices of memory 304 may include solid-state memory, hard drives, optical-disc drives, other hardware, or one or more combinations thereof. As indicated above, the computer storage media of the memory 304 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 300, or one or more combinations thereof.

The one or more processors 306 of user device 300 can read data from various entities, such as the memory 304 or the I/O component(s) 312. The one or more processors 306 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multipurpose or specific processor or controller, or one or more combinations thereof. In addition, the one or more processors 306 can execute instructions, for example, of an operating system of the user device 300 or of one or more suitable applications.

The one or more presentation components 308 can present data indications via user device 300, another user device, or a combination thereof. Example presentation components 308 may include a display device, speaker, printing component, vibrating component, another type of presentation component, or one or more combinations thereof. In some embodiments, the one or more presentation components 308 may comprise one or more applications or services on a user device, across a plurality of user devices, or in the cloud. The one or more presentation components 308 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 310 allow user device 300 to be logically coupled to other devices, including the one or more I/O components 312, some of which may be built in. Example I/O components 312 can include a microphone, joystick, game pad, satellite dish, scanner, printer, wireless device, and the like. The one or more I/O components 312 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 308 on the user device 300. In some embodiments, the user device 300 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 300 may, additionally or alternatively, be equipped with accelerometers or gyroscopes that enable detection of motion. In some embodiments, the output of the accelerometers or gyroscopes may be provided to the one or more presentation components 308 of the user device 300 to render immersive augmented reality or virtual reality.

The power supply 314 of user device 300 may be implemented as one or more batteries or another power source for providing power to components of the user device 300. In embodiments, the power supply 314 can include an external power supply, such as an AC adapter or a powered docking cradle that supplements or recharges the one or more batteries. In aspects, the external power supply can override one or more batteries or another type of power source located within the user device 300.

Some embodiments of user device 300 may include one or more radios 316 (or similar wireless communication components). The one or more radios 316 can transmit, receive, or both transmit and receive signals for wireless communications. In embodiments, the user device 300 may be a wireless terminal adapted to receive communications and media over various wireless networks. User device 300 may communicate using the one or more radios 316 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 316 may facilitate communication via radio frequency signals, frames, blocks, transmission streams, packets, messages, data items, data, another type of wireless communication, or one or more combinations thereof. The one or more radios 316 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for enhancing millimeter (mm) wave coverage within a wireless telecommunications network, the system comprising:
   one or more processors communicatively coupled with a plurality of antenna elements that provide a coverage area; and
   computer memory storing computer-usable instructions that, when executed by the one or more processors, cause the system to perform operations comprising:
      identifying a location of a user device within a sector of the coverage area;
      identifying a first physical object location for a first physical object that is between the location of the user device and the plurality of antenna elements;
      receiving physical object data for one or more physical objects within the sector of the coverage area provided by the plurality of antenna elements, wherein the physical object data comprises a permittivity value for each of the one or more physical objects;
      determining, using an algorithm, a required mm wave transmission power based on a first permittivity value of the first physical object;
      adjusting a current mm wave transmission power to the required mm wave transmission power; and transmitting a mm wave signal having the required mm wave transmission power to be received by the user device.

2. The system according to claim 1, wherein the physical object data comprises location data and external material data for each of the one or more physical objects.

3. The system according to claim 1, wherein the algorithm is an adaptive learning algorithm.

4. The system according to claim 1, wherein the mm wave signal having the required mm wave transmission power is transmitted directly through the first physical object to the user device.

5. The system according to claim 1, wherein the current mm wave transmission power is increased a first power threshold amount when the permittivity value of the first physical object is associated with a penetration loss less than a predetermined penetration loss threshold.

6. The system according to claim 1, wherein the system performs operations further comprising: identifying a second location of a second user device and a second physical object between the second user device and the plurality of antenna elements.

7. The system according to claim 6, wherein the system performs operations comprising: determining that an external material of the second physical object has a permittivity value associated with a penetration loss greater than a predetermined penetration loss threshold.

8. The system according to claim 7, wherein a handoff of the second user device to a different frequency band is initiated.

9. A method for enhancing millimeter (mm) wave coverage within a wireless telecommunications network, the method comprising:
   identifying a location of a user device within a sector of the coverage area;
   identifying a first physical object location for a first physical object that is between the location of the user device and the plurality of antenna elements;
   receiving physical object data for one or more physical objects within the sector of the coverage area provided by the plurality of antenna elements, wherein the physical object data comprises a permittivity value for each of the one or more physical objects;
   determining, using an algorithm, a required mm wave transmission power based on a first permittivity value of the first physical object;
   adjusting a current mm wave transmission power to the required mm wave transmission power; and
   transmitting a mm wave signal having the required mm wave transmission power to be received by the user device.

10. The method according to claim 9, wherein the physical object data comprises location data and external material data for each of the one or more physical objects.

11. The method according to claim 9, wherein the algorithm is an adaptive learning algorithm.

12. The method according to claim 9, wherein the mm wave signal having the required mm wave transmission power is transmitted directly through the first physical object to the user device.

13. The method according to claim 9, wherein the current mm wave transmission power is increased a first power threshold amount when the permittivity value of the first physical object is associated with a penetration loss less than a predetermined penetration loss threshold.

14. The method according to claim 9, wherein the system performs operations further comprising: identifying a second location of a second user device and a second physical object between the second user device and the plurality of antenna elements.

15. The method according to claim 14, wherein the system performs operations comprising: determining that an external material of the second physical object has a permittivity value associated with a penetration loss greater than a predetermined penetration loss threshold.

16. The method according to claim 15, wherein a handoff of the second user device to a different frequency band is initiated.

17. One or more non-transitory computer storage media having computer-executable instructions embodied thereon, that when executed by at least one processor, cause the at least one processor to perform a method comprising:

identifying a location of a user device within a sector of the coverage area;

identifying a first physical object location for a first physical object that is between the location of the user device and the plurality of antenna elements;

receiving physical object data for one or more physical objects within the sector of the coverage area provided by the plurality of antenna elements, wherein the physical object data comprises a permittivity value for each of the one or more physical objects;

determining, using an algorithm, a required mm wave transmission power based on a first permittivity value of the first physical object;

adjusting a current mm wave transmission power to the required mm wave transmission power; and transmitting a mm wave signal having the required mm wave transmission power to be received by the user device.

18. The one or more non-transitory computer storage media of claim 17, wherein the current mm wave transmission power is increased a first power threshold amount when the permittivity value of the first physical object is associated with a penetration loss less than a predetermined penetration loss threshold.

19. The one or more non-transitory computer storage media of claim 17, wherein the method further comprises:

identifying a second location of a second user device and a second physical object between the second user device and the plurality of antenna elements; and determining that an external material of the second physical object has a permittivity value associated with a penetration loss greater than a predetermined penetration loss threshold.

20. The one or more non-transitory computer storage media of claim 19, wherein a handoff of the second user device to a different plurality of antenna elements is initiated.

* * * * *